Oct. 21, 1969 R. A. HEDLER ET AL 3,474,040

PHOSPHOR RECLAMATION

Filed June 18, 1965 2 Sheets-Sheet 1

INVENTORS
ROBERT A. HEDLER,
JOHN FREDERICK LARSON &
ALBERT REGENBRECHT, JR.

BY

Robert E. Strauser
ATTORNEY

INVENTORS
ROBERT A. HEDLER,
J. FREDERICK LARSON, &
ALBERT REGENBRECHT, JR.
BY Robert E. Strauss
ATTORNEY 3,474,040

PHOSPHOR RECLAMATION

Robert A. Hedler, John Frederick Larson, and Albert Regenbrecht, Jr., Seneca Falls, N.Y., assignors to Sylvania Electric Products Inc., a corporation of Delaware Filed June 18, 1965, Ser. No. 464,947
Int. Cl. C09k *1/44*
U.S. Cl. 252—301.4 3 Claims

ABSTRACT OF THE DISCLOSURE

A method for reclaiming cathodoluminescent phosphors utilized in the fabrication of color cathode ray tube screens wherein the collected phosphor is selectively washed to remove soluble contaminants, dried, sieved, baked to remove combustible contaminants and again sieved to provide a phosphor material suitable for reuse in screen fabrication.

Figure 1:
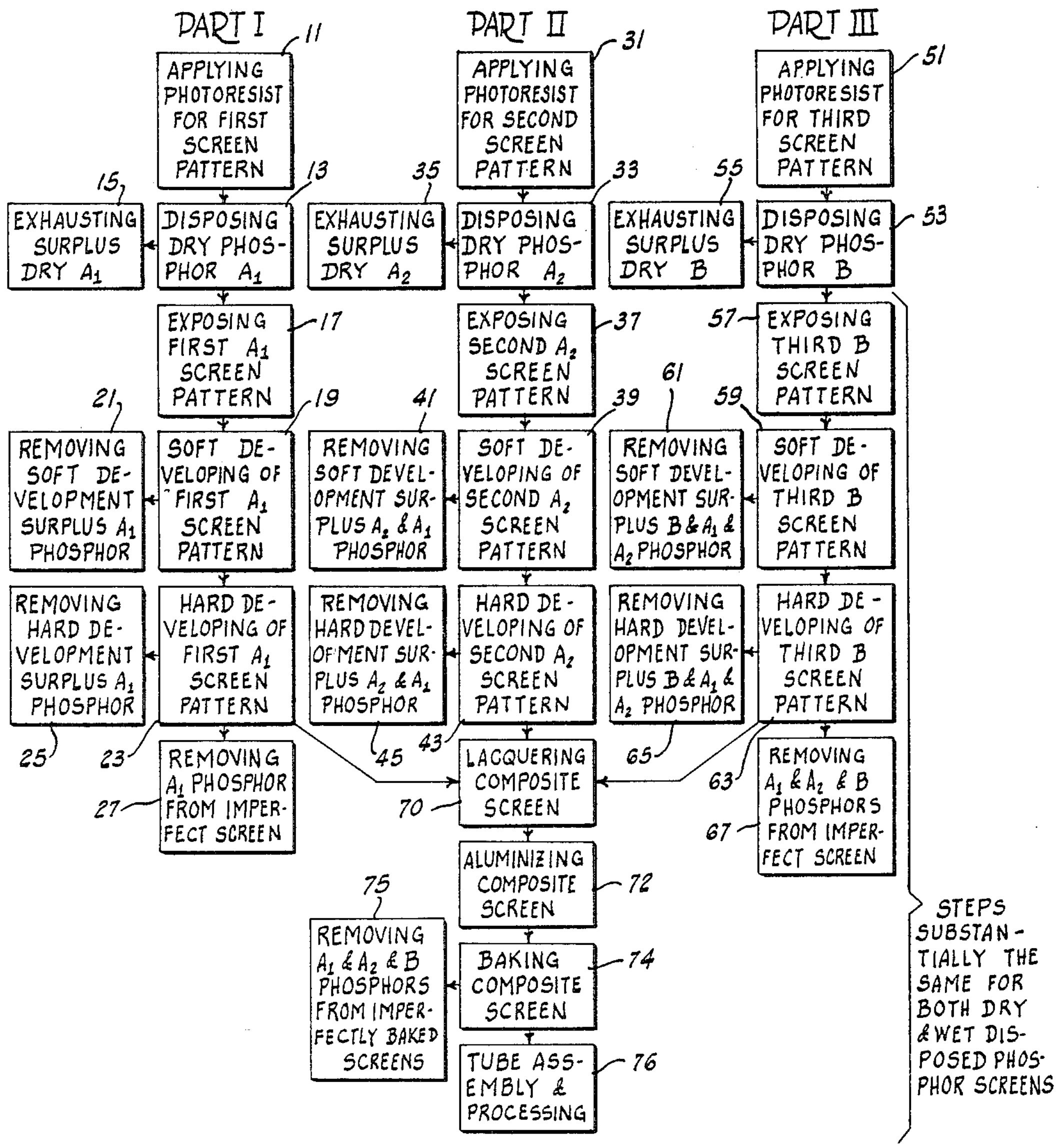

This invention pertains to cathodoluminescent phosphors and more particularly to methods for reclaiming cathodoluminescent phosphors utilized in cathode ray tube screening.

Color cathode ray tubes, especially those adapted for color television applications, conventionally employ at least one electron gun and a related viewing panel having a cathodoluminescent screen responsive to electron impingement disposed upon a surface thereof. Such a screen is generally comprised of a plurality of discretely patterned cathodoluminescent phosphor groups consisting of bars, stripes, or dots of specific fluorescent materials which, in response to electron beam excitation, produce the primary colors of green, blue, and red, respectively.

In the art of manufacturing color cathode ray tubes a cathodoluminescent screen of the above described type may be fabricated by one of several well-known methods for applying color phosphors to the inner surface of a viewing panel. For example, one of these screening methods, which has been found to be highly advantageous concerns a dry powder or dusting technique which is described in U.S. Patent 3,025,161, "Method of Forming Patterns" by Thaddeus V. Rychlewski and assigned to the same assignee as the present invention. Briefly, dry powder screening involves the forming of a confined phosphor-laden atmosphere from which powdered phosphor particles are applied or settled onto a layer of moist photosensitive resist material disposed on the inner surface of the cathode ray tube viewing panel. By discrete light exposure through a foraminous mask, positioned adjacent the resist covered panel, multiple areas of phosphor are attached by light activated cross-linking or enhanced polymerization of the photoresist material to form a photopatterned screen containing a multiplicity of discrete areas of the particular phosphor. (To simplify explanation, the term "polymerization" is used in this specification to define cross-linking of the polyvinyl alcohol chains.) The phosphor particles applied to the resist material on the unexposed intervening areas of the screen are unattached since the photoresist associated therewith is unpolymerized. Thus, the phosphor and photoresist are easily and desirably removed by a subsequent developing operation which dissolves and rinses away the unexposed photoresist carrying with it the unadhered phosphor material. This procedure is repeated for each color phosphor selectively disposed in the fabrication of the plural-color patterned screen.

By the conventional dry powder technique, only a fraction of each specific phosphor material, applied in the initial screening operation, remains as an integral part of the finished screen. The nature of the dry powder deposition is such that a considerable amount of the phosphor material is exhausted in the form of phosphor-laden atmosphere at the completion of this initial step. In addition, as has been mentioned, a large portion of the applied phosphor material is associated with unpolymerized photoresist material, and therefore being unattached is washed away at subsequent developing. In general, the aforementioned excess phosphors which are removed as surplus material from the various stages of the powder screening process have been handled as waste material. Since certain of the phosphors, especially the rare earth varieties, are expensive materials, considerable monetary value is manifest in the loss of such phosphors.

Another conventional method for forming cathodoluminescent phosphor cathode ray tube screens is by the wet or slurry method wherein the phosphor being mixed with the photoresist material, is disposed as a liquid slurry coating on the panel. After exposure development, the wet disposed phosphor screen pattern is consummated in a manner similar to that utilized for the aforedescribed dry powder formed screens. The surplus phosphor removed by developing the exposed pattern of the slurry disposed screen likewise represents material of appreciable value.

In addition, regardless of the method used for forming the screen, the respective phosphors contained in imperfectly screened patterns and in unacceptable finished composite screens represent sizable quantities of materials having potential salvage value.

Accordingly, it is an object of the invention to provide an expedient and inexpensive method for reclaiming the excess phosphors removed as surplus material from a cathode ray tube screening process.

A further object is to provide a method for reclaiming the phosphors salvaged from imperfect screens scrapped during cathode ray tube fabrication or from discarded finished tubes.

Another object is the provision of a phosphor reclamation method that will yield materials free from contaminants, and one that can be repetitively practiced with consistent quality results that will yield phosphor material suitable for reuse.

The foregoing objects are achieved in one aspect of the invention by the provision of a cathodoluminescent phosphor reclamation method wherein the phosphor material, surplus to cathode ray tube screening, is collected, water washed to remove soluble contaminants, dried coarse sieved to remove large phosphor agglomerates and insoluble contaminants, air baked to remove combustible contaminants, and again sieved to break up and remove agglomerates resultant from baking. This produces reclaimed phosphor material suitable for reuse either alone or in blended combination with the same type of new or virgin phosphor material.

Figure 2:
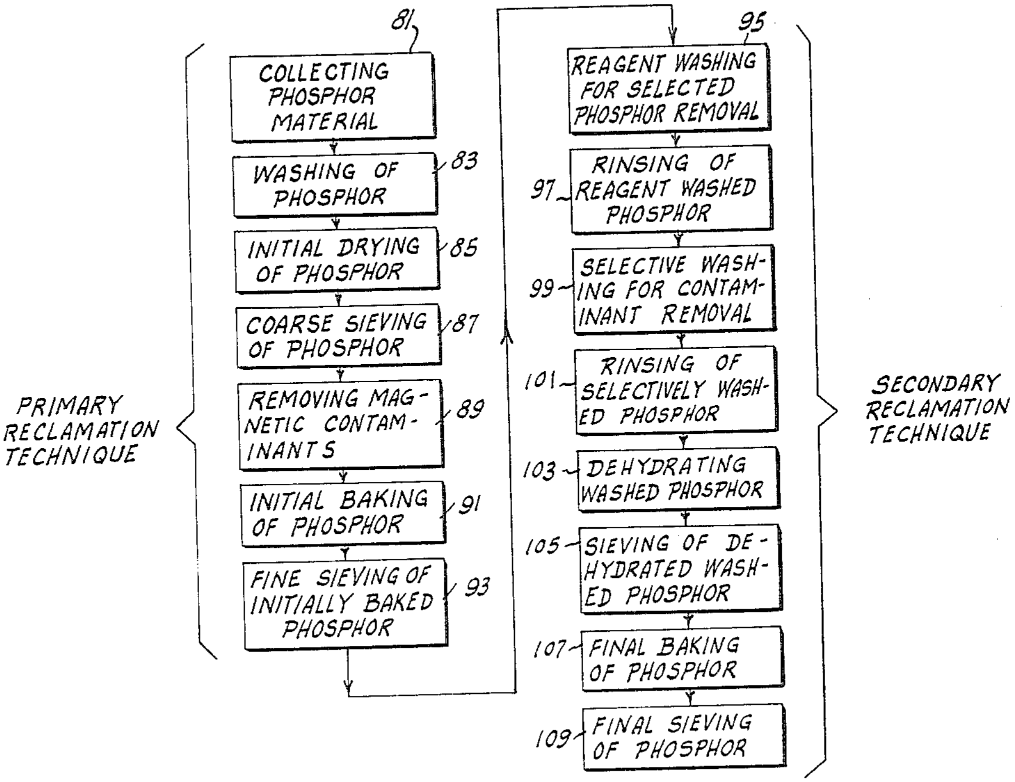

For a better understanding of the present invention, together with other and further objects, advantages, and capabilities thereof, reference is made to the following specification and appended claims in connection with the accompanying drawings in which:

FIGURE 1 is a flow diagram listing the several procedures for fabricating a dry powder cathode ray tube screen; and FIGURE 2 is a flow diagram showing the steps for reclaiming cathodoluminescent phosphors utilized in color cathode ray tube screens.

In referring to FIGURE 1, there is shown by way of example a block diagram illustrating a three-part fabrication method for disposing a dry powder phosphor color cathode ray tube screen, wherein several different color phosphors are applied to the screen panel in accordance with Parts I, II, and III, respectively. The sequence for the deposition of the specific color phosphors is not fixed and may be varied in accordance with processing variables to produce an optimum quality screen. By way of illustration, in one possible sequence, the three color phosphors are designated as $A_1$, $A_2$, and B, respectively. In this instance, $A_1$ denotes a blue-emitting cathodoluminescent phosphor such as zinc sulfide; $A_2$ a green-emitting phosphor, such as zinc cadmium sulfide; and B a rare earth red-emitting phosphor, as for example yttrium vanadate. It is to be noted that the aforementioned examples of $A_1$, $A_2$, and B phosphor designations are not to be considered as limiting for composition or color cathodoluminescence.

With reference to Part I of FIGURE 1, there is designated by block 11 the step of applying a photoresist material, such as for example, polyvinyl alcohol sensitized with ammonium dichromate which may be sprayed or flowed over the inner surface of the screen panel to form a coating of uniform thickness thereon. Upon this coated panel, the first color phosphor $A_1$, which in this instance is blue-emitting cathodoluminescent zinc sulfide, is deposited from a confined atmosphere of dry phosphor powder as per block 13 to provide an even coating of phosphor thereover. One way of accomplishing this dry powder deposition step is by placing the panel open-face up within a metallic dusting enclosure wherein a confined atmosphere of air-borne phosphor particles is provided. From this atmosphere, phosphor particles settle to form a layer of uniform thickness over the photoresist material. Upon achieving a phosphor layer of desired thickness, the surplus phosphor atmosphere is exhausted from the dusting enclosure as per block 15. The dusted panel is thence removed and the enclosure cleaned by a pressurized air brush procedure before reuse. Air cleaning of the enclosure also yields surplus phosphor which is exhausted and collected in the manner as aforedescribed.

For the $A_1$, screen exposure step as noted in block 17, a foraminous mask is oriented adjacent the tube panel in spaced relationship with the phosphor coating thereon. Light which is predominately ultraviolet from an off-center source is beamed on the mask and passes through the aperture thereof to impinge upon and polymerize a plurality of discrete areas of the sensitized polyvinyl alcohol therebeneath. This polymerization of the photoresist material effects adherence of the associated phosphor particles to the discretely exposed screen areas.

After exposure, the mask is removed from the panel and the first or soft development of the blue-emitting $A_1$ or zinc sulfide phosphor pattern is consummated as indicated in block 19. In this soft development step the entire inner surface of the panel is washed with a soft flow or spray of developing fluid such as deionized water. Since unpolymerized polyvinyl alcohol is water soluble the major portion of this unexposed surplus material is removed during this first or soft development step 17 and carries along with it the associated surplus $A_1$ phosphor material as indicated in block 21. The soft development step is immediately followed by the second or hard development step for the disposed $A_1$ phosphor, as noted in block 23, wherein the panel is subjected to a more forceful flow or jet spray of fluid, such as deionized water, to more completely remove the remaining unpolymerized polyvinyl alcohol and the associated surplus $A_1$ phosphor as noted in block 25. Thus, a first pattern of $A_1$ color phosphor, in the form of a multiplicity of spaced blue-emitting zinc sulfide dots, is disposed on the inner surface of the viewing panel.

A second color pattern of a different color phosphor is similarly disposed on the viewing panel to occupy a portion of the spacing between the color phosphor dots of the first color pattern. The forming of this second color pattern is illustrated by Part II of the fabrication block diagram of FIGURE 1. A coating or layer of photoresist material, such as polyvinyl alcohol sensitized with ammonium dichromate is applied over the residual first color pattern on the viewing panel as indicated in block 31 in a manner similar to that explained for block 11. Over this photoresist coating a uniform layer of a second dry color, $A_2$ phosphor, such as green-emitting cathodoluminescent zinc-cadmium sulfide, is deposited from a confined atmosphere as denoted in block 33. The surplus $A_2$ dusting atmosphere and the dry $A_2$ phosphor particles cleaned from the dusting enclosure are exhausted as per block 35 to a suitable dust collector.

The exposure 37 of this second phosphor-photoresist combination is accomplished, through the repositioned foraminous mask, in a manner alike that utilized in exposure step 17, except the light source is oriented off-center in a position substantially 120 degrees from that utilized for the $A_1$ phosphor pattern exposure. Thus, the $A_2$ screen pattern exposure technique 37 beams light through the mask apertures to impinge the coated panel in areas spaced from, but adjacent to, the first $A_1$ pattern dots. After removal of the mask, the soft and hard developments of the $A_2$ color phosphor pattern as indicated by blocks 39 and 43, respectively, are accomplished in the manner as described for the soft and hard $A_1$ pattern developments 19 and 23. This results in a residual green-emitting second color $A_2$ phosphor pattern spaced within the residual blue-emitting first color $A_1$ phosphor pattern with the respective dots of the different green and blue emitting color phosphors being adjacent to one another. It is important to note that in the soft and hard $A_2$ development steps, the liquid removal of the disposed surplus $A_2$ phosphor, as designated in blocks 41 and 45, usually contains minute quantities of residual $A_1$ phosphor that are loosened by the second screen pattern liquid development steps. Usually, only an infinitesimal amount of the residual $A_1$ phosphor is removed by the soft spray of the first $A_2$ development 39. The jet spray of the second or hard development 43, being somewhat more erosive, most generally causes the release of an additional minute quantity of disposed $A_1$ material.

A third color pattern of a cathodoluminescent phosphor having a color emission different from those already disposed in the first and second color patterns, respectively, is disposed in the aforedescribed manner to occupy the remaining portion of spacing between the dots of the previously formed patterns. The forming of the third or B phosphor red-emitting color pattern is noted in Part III of FIGURE 1. Again, a coating of sensitized polyvinyl alcohol is applied over the residual first and second color patterns on the viewing panel as designated in block 51. This is followed by the deposition, from a confined atmosphere, of a uniform layer of a third dry B color phosphor which in this instance is a red-emitting cathodoluminescent rare earth material such as yttrium vanadate, as noted in block 53. The surplus B phosphor laden atmosphere and the dry phosphor particles subsequently cleaned from the dusting enclosure are exhausted and suitably collected as designated in block 55. Exposure of this third B phosphor-photoresist combination, as shown in block 57, is accomplished by again utilizing the repositioned foraminous mask and another off-center light source positioned substantially 120 degrees from either the $A_1$ or the $A_2$ exposure sources. By the B screen pattern exposure procedure 57, light is beamed through the mask to impinge the panel in the remaining vacant areas adjacent the formed dots of the first and second color patterns. The subsequent soft and hard development steps for the B phosphor screen, as denoted in blocks 59 and 63, are accomplished in the manner previously described for the $A_1$, and $A_2$ phosphor patterns. In the soft and hard B development steps, the liquid removal of disposed surplus B phosphor, as per blocks 61 and 65, usually contains minute quantities of the previously disposed $A_1$ and $A_2$ phosphors that are loosened from the respective screen patterns. The fulfillment of the development steps 59 and 63 results in a third residual color pattern of B red-emitting color phosphor oriented within the remaining spacing between the aforedescribed $A_1$ and $A_2$ blue and green-emitting phosphor dots. Thus, the three color patterns taken together form a composite tri-color cathode ray tube cathodoluminescent screen.

The composite screen is coated with a film of nitrocellulose lacquer, per block 70, to provide the desired backing for the mirror-like film of aluminum which is vacuum disposed as noted in block 72. The screened panel is then baked per block 74, at a temperature within the range of 400° to 500° C. to remove by volatilization the lacquer and residual photoresist materials. The reflective aluminum film is thence supported directly by the phosphor crystals forming the screen. This finishes processing of the screen per se. In the ensuing conventional tube processing, the screen panel, with its foraminous mask suitably positioned therein, is joined to the funnel portion of an envelope. An electron gun assembly is sealed within the neck portion of the envelope in a manner to facilitate electron impingement of the screen. Forming a vacuum within the tube in conjunction with degassing the internal structure thereof completes the processing of the tube. The assembly of the tube and the ensuing processing is noted by block 76 in FIGURE 1.

With reference to FIGURE 1, it is important to note that the exposure steps for the respective screen patterns and the ensuing steps thereafter are substantially the same for both dry and wet disposed phosphor screens. Thus, regardless of mode of deposition, the surplus phosphor materials removed by development can be reclaimed by the same to-be-described methods.

Since the phosphors applied and removed as surplus materials during screening represent considerable monetary value, an expeditious method has been developed to reclaim a major portion of these surplus phosphors for reuse in subsequent screening applications.

In considering each of the respective dry phosphor deposition steps as aforedescribed for blocks 13, 33, and 53 in FIGURE 1, the surplus phosphor laden atmosphere, in each instance, is exhausted from the respective dusting enclosure through a noncontaminating duct and collected in a separate conventional closed-type dust collector. In addition, the phosphor containing atmosphere, resultant from the air cleaning of the respective dusting enclosure after each deposition step, is likewise exhausted and duct conveyed to the proper collector. In each case, the respective surplus $A_1$, $A_2$ and B dry phosphors are separately collected, and thus are not cross-contaminated one with the other since each of the surplus dry phosphors represents air-borne material exhausted from the proximity of the screen. It is important to note that while these surplus phosphor particles are ambient to the screen, they are not removed or pulled loose from the actual surface thereof.

With reference to FIGURE 2, a flow diagram is shown listing a multi-step procedure for expeditiously reclaiming phosphors utilized in cathode ray tube screening. This reclamation procedure is divided into two categories, i.e., Primary and Secondary Techniques as will be subsequently explained. A number of steps are listed in the techniques of this procedure to accomplish optimum reclamation results of desired quality, but, since the collected phosphor material varies in content and quantity of contaminating inclusions, certain steps may be omitted or combined without detracting from the intent and scope of the invention.

Since, as has been mentioned, the individually collected surplus dry phosphors $A_1$, $A_2$, and B are not cross contaminated, they are most easily reclaimed by the Primary Reclamation technique. This Primary Procedure is advantageous in that it provides a common method appropriate for individual surplus phosphor reclamation regardless of the chemical composition of the respective phosphor. With reference to the detailed procedure of this method, the individually collected $A_1$, $A_2$, or B phosphor is indicated by block 81. Effort is made to exclude foreign contaminating materials and retain phosphor purity by using interiorly smooth stainless steel ducts and utilizing sufficient exhaust evacuation therein to keep the phosphor particles from settling in transit to the respective collector stations. It is to be recognized that other air-borne materials, prevalent in the proximity, are likewise exhausted with the phosphor laden atmosphere. In the reclamation process, this dry collected surplus phosphor material may be water washed, as noted in block 83, if water soluble contaminants are known or suspected as being present therein; but usually this water washing step is omitted for the dry collected powder material as there is little opportunity for foreign materials of this nature to mix with and contaminate the dry collected phosphors. If, however, the initial washing of block 83 is utilized, a quantity of phosphor is disposed in a stainless steel or ceramic container of suitable size and a copious amount of a liquid wash such as deionized water added thereto. For example, ten to fifteen pounds of phosphor are placed in a five-gallon stainless steel container wherein the phosphor is suspended in water by gentle agitation, allowed to settle and the water decanted therefrom. This procedure may be repeated several times as desired. The illustration is not limiting as to the size of the container or the quantity of phosphor material placed therein. Whether washed or not, the collected surplus phosphor is usually subjected to an initial drying step, as signified in block 85 to remove any moisture condensation which may have occurred in the collection area or to dry water washed phosphor if such be the case. In one way of expeditiously accomplishing this drying step, the material is spread in open heat resistant trays, such as of suitable glass or ceramic, and subjected to oven heat for a period of several hours at a temperature in excess of 90° C., but usually less than 200° C. as it is not desired to remove volatile or combustible contaminant materials at this stage. The resultant dryness of the phosphor material removes moisture adherent to the crystals and facilitates free movement of the individual particles relative to one another, a fact which is advantageous to the consummation of the coarse sieve step as noted in block 87.

It has been found that regulation of temperature and humidity in the surplus dry phosphor collection areas aids in controlling moisture condensation therein and thus reduces the need for additional drying of the phosphor powder prior to coarse sieving.

The initial sizing or Coarse Sieve operation 87 is accomplished by mechanically agitating the dried phosphor material through a mesh screen having openings larger than .044 millimeter. For example, a sieve of this size allows passage therethrough of particles having dimensions up to 44 microns, while phosphor agglomerates along with foreign materials such as bits of paper and other contaminants of greater size are thereby removed. It is evident that coarse sieving is expedited by the use of large mesh openings.

Associated with the first sieve operation is a magnetic separation grating, per block 89, wherein magnetic contaminants, if such are present, are removed from the sieved material as it passes therethrough. An example of a magnetic contaminant may be bits or particles of iron materials dispersed from associated screening equipment.

The sieved phosphor is next subjected to the Initial Baking step as identified by block 91. In this step the phosphor is preferably disposed as a shallow layer in suitable heat resistant glass or ceramic trays and baked at approximately 450° C. for a period of time sufficient to remove any combustible materials such as lint, hair, etc. that may be present therein. The baking temperature is within the range to which the phosphor is subjected during cathodoluminescent screen bake-out and therefore is not harmful to the phosphor per se. The cathodoluminescent phosphors conventionally utilized in cathode ray tube screen fabrication have decomposition temperatures well above 600° C. This Initial Baking procedure can be accomplished in an oven or by a continuous lehr type heating operation. It has been found beneficial to shield the phosphor material from contaminants during baking by placing suitable glass or ceramic covers over the trays in slightly raised orientation thereabove.

After the Initial Bake step the phosphor is again sized by a Fine Sieve procedure, as designated by block 93. In this operation the mechanical agitation of a smaller apertured sieve breaks up and removes phosphor particle agglomerates resultant from the phosphor baking step 91. Sieves found to be adequate for this sizing can be either U.S. Standard Sieves No. 325 or 400 or the equivalent thereof, which, having openings of .044 millimeter and .037 millimeter therein, will pass maximum particle size of 44 and 37 microns respectively, but smaller sieve sizes can be utilized if desired. The completion of this second sieving operation fulfills the normal Primary Reclamation Technique and the respective dry phosphors thus reclaimed are of a size range ready for reuse either alone or in blended combination with like virgin or new phosphors as may be desired for the screening application.

It has been found that with a modicum of contamination present in the individual dry phosphor material, per blocks 15, 35, and 55, the number of Primary Reclamation steps required to achieve a reclaimed phosphor of a desired consistent quality will include at least the steps of: Collecting 81, Coarse Sieving 87, Initial Baking 91, and Fine Sieving 93.

As aforementioned in this description and noted in FIGURE 1, a major portion of each respective phosphor disposed on the screen is removed, as a result of screen pattern development, along with the associated unpolymerized photoresist material. In referring to blocks 21 and 25 of FIGURE 1, the liquid-borne $A_1$ surplus phosphor, not being water soluble, is collected or trapped in special provisions such as weirs and filter presses suitably oriented in the respective development drainage systems. Since the $A_1$ phosphor, in this instance, blue-emitting cathodoluminescent zinc sulfide, is the first disposed in the screen formation, it is not contaminated by the other phosphors. Therefore, the $A_1$ phosphor can be reclaimed by the aforedescribed Primary Reclamation Procedure, wherein the Water Washing step 83 is utilized to remove the water soluble contaminants, such as for example the sensitized polyvinyl alcohol, from the collected phosphor.

Panels having imperfect first screen patterns formed thereon may have the phosphors salvaged therefrom. One procedure for removing the $A_1$ phosphor comprising the first screen pattern involves baking the screened panel at approximately 450° C. to volatilize the polymerized photoresist. This leaves the $A_1$ phosphor as residual material which can be vacuum removed, as per block 27, and subsequently reclaimed in accordance with the aforedescribed Primary Reclamation Technique.

In Part II of FIGURE 1 the second or $A_2$ phosphor is disposed on the screen. In this case the $A_2$ phosphor is green-emitting cathodoluminescent zinc-cadmium sulfide which is likewise insoluble in water. As has been perviously mentioned, the developed $A_1$ screen pattern may release an infinitesimal number of phosphor particles during the soft spray of the first $A_2$ screen pattern development step 39. It is important to note that the phosphor particles associated with the $A_1$ screen pattern are not markedly disturbed by the soft spray of the first $A_2$ development since they have previously withstood the jet spray of the $A_1$ second development step and have the added benefit of increased adherence, effected by time accentuated polymerization of the polyvinyl alcohol of the $A_1$ screen pattern. The surplus $A_2$ sulfide phosphor, which is liquid suspended and removed per block 41 as a result of the soft $A_2$ development step 39, is collected by drainage provisions similar to those described for trapping the surplus $A_1$ development phosphor in step 21. If this collected first development surplus $A_2$ phosphor includes an amount of $A_1$ material considered insignificant as a contaminant, the $A_2$ is reclaimed by the previously described Primary Reclamation Procedure as noted by blocks 81 to 93 in FIGURE 2; but, if the quantity of included $A_1$ phosphor is significant as a contaminant, the mixed sulfide phosphors are not considered worthwhile to salvage since a mixture of sulfide phosphor does not presently lend itself to an economically feasible method of separation without requiring a subsequent reconstitution of the individual phosphors.

In the hard or second development of the $A_2$ screen pattern, as showns in block 43 of FIGURE 1, the jet spray is of sufficient force to remove not only the surplus $A_2$ phosphor but may also release $A_1$ phosphor particles extraneous to the $A_1$ screen pattern. Thus, the surplus $A_2$ phosphor removed by liquid suspension per block 45 also may contain enough $A_1$ phosphor to be considered as a contaminant. As such, the mixed $A_1$ and $A_2$ sulfide phosphors are not presently considered as being worthwhile to reclaim.

While zinc sulfide and zinc-cadmium sulfide are noted as examples of the $A_1$ and $A_2$ phosphors respectively, they are not to be considered as limiting. The $A_1$ and $A_2$ designations are intended to include other cathodoluminescent color-emitting phosphors as well.

The described forming of the third or B phosphor screen pattern as noted in FIGURE 1 utilizes an aforementioned rare earth phosphor as for example, europium activated yttrium vanadate which is capable of red-emitting cathodoluminescence. While yttrium vanadate is mentioned, the phosphor host crystal may also be a vanadate of other trivalent metals such as gadolinium or lutetium activated with at least one trivalent rare earth element such as europium and samarium. As a group, the rare earth phosphors are extremely hardy materials that do not readily enter into chemical reaction with most reagents. This is an important factor in the chemical reclamation of the rare earth class of cathodoluminescent phosphors.

The soft or first development step 59 of the B phosphor screen pattern, removes the surplus B phosphor from the screen in the same manner as the surplus $A_1$ and $A_2$ phosphors were previously removed in their respective development operations. Some particles of the residual $A_1$ and $A_2$ phosphor screen patterns are disturbed by the soft spray of the first developmental removal of the surplus B phosphor as per block 59. Thus, the surplus B phosphor collected as liquid suspended material at the soft development removal step, as noted in block 61, may include infinitesimal amounts of previously disposed $A_1$ and $A_2$ phosphors. If the quantity of $A_1$ and $A_2$ included material represents an insignificant level of contamination, the surplus B phosphor from this soft development step 59 can be reclaimed in accordance with the aforedescribed Primary Reclamation Technique as shown in FIGURE 2, blocks 81 to 93; but if the $A_1$ and $A_2$ inclusions are of a contaminating level, both the Primary and to-be-described Secondary Reclamation Techniques are utilized to selectively salvage the B material.

The jet spray of water utilized in the hard development step of the B screen pattern is of sufficient force to loosen some $A_1$ and $A_2$ phosphor materials associated with the screen area or perimetrical thereto. These are mixed with the B phosphor as a result of the second or hard development step 63 and are collected along with the suspended surplus B phosphors per block 65. While the amount of $A_1$ zinc sulfide and $A_2$ zinc-cadmium sulfide mixed with the surplus B yttrium vanadate are minor quantities, they are contaminants which must be removed if the surplus yttrium vanadate is to be reused. The mixed phosphors collected as removed surplus materials resultant of the hard development step for the B phosphor screen pattern, blocks 63 and 65, are treated by both the Primary and Secondary Reclamation Techniques as listed in FIGURE 2. The mixed vanadate and sulfide phosphors are subjected to the sequential treatment of Washing 83, Initial Drying 85, Coarse Sieving 87, Initial Baking 91, and Sieving 93 which are procedural steps previously described as constituting the Primary Reclamation Technique.

In continuing the reclamation with the Secondary Technique the Selected Phosphor Removal is accomplished in step 95 wherein the europium activated yttrium vanadate ($YVO_4$:Eu) remains as the selected phosphor, the sulfides mixed therewith being chemically separated therefrom. Specifically, the mixture of sulfides retained or held between the rare earth phosphor crystals includes the blue-emitting silver activated zinc sulfide (ZnS:Ag) and the green-emitting silver activated zinc-cadmium sulfide (Zns-Cds:Ag)

As previously stated, it is not economical feasible to separate these mixed sulfides one from the other per se, and, therefore they are both decomposed to facilitate removal from the presence of the hardly vanadate phosphor crystals. The quantity of silver activator included with the sulfide hosts is an extremely small amount ranging substantially from .001 to .050 mole percent; the maximum representation of silver activator being approximately five hundred parts per million of host (500 p.p.m.). In greater detail, the mixture of phosphors is chemically washed or treated in a glass or ceramic vessel with a dilute mineral acid such as 10 to 15 percent hydrochloric acid (HCl) as the Reagent Wash in the Selected Phosphor Removal step 95. Other suitable mineral acid reagents include sulfuric acid ($H_2SO_4$) and nitric acid ($HNO_3$). While the reaction will progress slowly at room temperature, it is preferable to utilize an acid wash having a temperature of 70° to 80° C. As mentioned, the $YVO_4$:Eu being of an extremely hardy crystal formation does not react appreciably with this HCl wash. Although the rare earth phosphor is substantially unaffected per se by this operation, the silver activated sulfides are definitely reactive with the acid. The decomposition of the respective sulfides promotes the synthesis of zinc chloride ($ZnCl_2$) and cadmium chloride ($CdCl_2$), both of which are soluble in the acid and water. The infinitesimal amount of silver activator becomes precipitates of silver chloride (AgCl) and/or silver sulfide ($Ag_2S$) both of which are slightly soluble in warm acid and water. During the reaction, hydrogen sulfide ($H_2S$) is released to saturate the solution and be expelled therefrom as a gas which, being both obnoxious and poisonous, necessitates adequate hooding and ventilation for the operation. After agitation and settling of the phosphor, decantation of the acid wash also removes most of the soluble chlorides from the presence of the rare earth yttrium vanadate phosphor.

A Rinsing step 97 follows the Phosphor Removal Step 95 wherein the rare earth phosphor is rinsed and agitated in a copious amount of pure water. After which the suspended rare earth phosphor is allowed to settle, and the rinse water is thence decanted to completely remove the water soluble chlorides therefrom. Substantially all of the minute amount of AgCl and $Ag_2S$ are either dissolved or washed away by this rinsing operation.

There are times when water insoluble contaminants other than the sulfide phosphors, become mixed with the collected phosphors. These may be in the form of airborne foreign materials which are sometimes present in automated manufacturing environments. Typical minute bodies such as metallic particles may be atmospheric suspended and carried for considerable distances from the source of introduction before settling. For example, small particles of copper compounds may be accidentally introduced into the atmosphere ambient to improperly operating electric motors or resultant of open-electrical arcing. The exact composition of these air-borne copper compounds is difficult to determine since the mode of formation and atmospheric gaseous content and conditions are influencing factors. Typically, such compounds may include copper oxide, copper hydroxide and copper nitrate. It is important to mention that copper and copper compounds have deleterious effects in the forming of color screens containing sulfide phosphors in that copper tends to replace the silver activator therein and thereby alters the cathodoluminescent characteristics thereof effecting, for example, hue shift and increased persistance. At this stage in phosphor reclamation, while copper has no effect on the rare earth phosphor per se, it is important to rid the rare earth phosphor of any extraneous copper so that copper or the compounds thereof are not carried back to the screen by the reclaimed rare earth phosphor to contaminate the adjacently oriented sulfide areas. Therefore, a Selective Washing step 99 is included in the Secondary Reclamation Technique to remove water-insoluble contaminants when such are known or suspected as being present with the rare earth phosphor.

Following the Rinsing of the Reagent Washed Phosphor, the phosphor is treated with the Selective Wash, being in this instance, approximately a 10 percent solution of ammonium hydroxide ($NH_4OH$) at a temperature not exceeding 100° C. Ammonium hydroxide is chosen because it decomposes or converts all of the commonly encountered insoluble copper compounds changing them to water soluble compositions. After agitation in a suitable container, the suspended phosphor crystals are allowed to settle and the ammonium hydroxide decanted therefrom. While ammonium hydroxide has been listed as a typical reagent for utilization in the Special Wash, other pertinent reagents such as acids, bases and complexing agents may be satisfactorily used in like manner depending upon the type of contaminant to be chemically removed. For example, hydrofluoric acid (HF) is used to remove contaminating glass particles, and sodium hydroxide (NaOH) has been utilized to improve body color of the vanadate phosphor crystals.

As noted in block 101, water not exceeding 100° C., is introduced to rinse the Selectively Washed Phosphor whereupon agitation, settling, and decantation are repeated to consummate removal of the water soluble materials.

The cleaned rare earth phosphor is next subjected to the Dehydration step 103 wherein it is heated to a temperature not exceeding 200° C. The resulting dryness of the cleaned phosphor crystals facilitates the Sieving operation 105 wherein the phosphor is passed through a fine mesh such as for example a No. 230 U.S. Standard Sieve which will pass 62 micron particles. The size of the sieve openings are not particularly critical in this Sieving step 105 since the primary purpose is to break up processing agglomerations and remove large size foreign bodies which may have been accidently introduced during processing. The sieved material is thus conditioned for a baking treatment to further remove contamination present.

A Final Baking, at approximately 450° C., per block 107, follows the Sieving of the Dehydrated Washed Phosphor 105 to insure removal of any combustible materials that may have been included after the Initial Bake step 91.

A Final Sieve step 109 follows the Final Baking 107 to break up baking agglomerates and insure the proper maximum crystal size of the reclaimed rare earth phosphor. Suitable sieve sizes are U.S. No. 325 and 400 which will pass maximum particle sizes of 44 microns and 37 microns respectively. The reclaimed B phosphor is now ready for reuse in the screening process and may be so used alone or in blended combination with like new or virgin phosphor or for any use in which new phosphor may be utilized.

Imperfect screens evidenced after the deposition of the third screen pattern may have the B phosphor salvaged therefrom. Air baking the panel volatilizes the photoresist leaving the $A_1$, $A_2$, and B phosphors as residuals. These can be vacuum removed as a mixture, as per block 67, and reclaimed by the combined Primary and Secondary Reclamation Techniques.

The sequential progression of Primary and Secondary Reclamation Steps provide a procedure for achieving high quality phosphor reclamation. As previously mentioned, certain steps may be omitted or combined in accordance with the contaminants present. It has been found that with a minimum of natural contamination present in a mixture of at least one A phosphor and a B (rare earth) phosphor, as for example per blocks 61, 65, and 67, the number of combined Primary and Secondary Reclamation steps required to achieve a reclaimed B rare earth phosphor of desired consistent quality will include at least the steps of: Collecting 81, Water Washing 83, Initial Drying 85, Coarse Sieving 87, Reagent Washing 95, Rinsing 97, Dehydration 103, Sieving 105, Final Baking 107, and Final Sieving 109.

It is evident that the rare earth B phosphor can, if desired, be disposed as the first screen pattern in place of the $A_1$ sulfide phosphor. If such be the screening sequence, the surplus phosphor removed by the soft and hard development steps would be free of sulfide phosphor and can be adequately reclaimed by the aforedescribed Primary Reclamation Technique. If it is desired to dispose the B phosphor as the second phosphor in the screening process, the surplus from developing would include some of the previously disposed $A_1$ sulfide phosphor; in which case separation of the $A_1$ from the B is accomplished in the same manner as described, i.e. by the combined Primary and Secondary Reclamation Techniques.

Another source of salvageable phosphor materials is manifest as a result of the screen baking as shown in step 75 of FIGURE 1 wherein certain types of screen imperfections become evident and constitute a scrap item. Since the lacquer and photoresist material has been volatilized by baking, the phosphors constituting the screens may be removed from these discards by, for example, a vacuum procedure; and the $A_1$, $A_2$, and B phosphors duct conveyed therefrom and collected as a mixture in a suitable collecting enclosure. The mixed phosphors are then reclaimed by the aforedescribed Primary and Secondary Reclamation Procedures. The amounts of sulfide phosphors present in the mixture are relatively large, therefore, several Reagent washes in the selected Phosphor Removal step 95 are necessary followed by adequate rinsing. The aluminum present is converted and removed as aluminum chloride. Other materials suitable for reclamation are the phosphors salvaged from the screen panels of scrap finished tubes. Regardless of the method of screen deposition, these mixed phosphors can be adequately reclaimed in the manner as previously described in the combined Primary and Secondary Techniques.

The high purity of the respective $A_1$, $A_2$, and B phosphors reclaimed by the aforedescribed methods are such that the reuse of these phosphors, in cathode ray tube screen fabrication, is not limited to reuse in a particular technique alone. These reclaimed phosphors are equally applicable for use in either of the conventional dry or wet screening techniques.

Thus, expedient and inexpensive methods are provided for reclaiming cathode ray tube phosphors. The procedures are capable of repetitive practice with consistent results, and provide reclaimed phosphors that have the degree of quality and purity necessary for reuse in conventional cathode ray tube screen pattern fabrication. The methods have produced desired results heretofore unachieved.

What is claimed is:

1. In considering the materials utilized in cathode ray tube screen fabrication, a method for reclaiming a substantially reagent resistant cathodoluminescent phosphor from a phosphor salvage mixture including at least one other second type of phosphor comprising the steps of:

collecting said mixture of phosphors;

water washing of said mixture of phosphors to remove water soluble contaminants therefrom;

initial drying of said washed mixture of phosphors to dispel moisture and facilitate free movement of individual phosphor particles;

coarse sieving of said dried mixture of phosphors to remove large phosphor particles and contaminants therefrom;

initial baking of said coarse sieved mixture of phosphors to remove combustible contaminants;

sieving of said baked mixture of phosphors to break up and remove agglomerates resultant from said baking;

reagent washing of said sieved mixture of phosphors to decompose and separate said second phosphor and materials from said reagent resistant phosphor;

rinsing of said reagent resistant phosphor to remove said reagent and decomposed second phosphor materials therefrom;

selective chemical washing of said reagent resistant phosphor to remove contaminants other than decomposed second phosphor materials;

rinsing of said reagent resistant phosphor to remove decomposed contaminant materials therefrom;

dehydrating said washed reagent resistant phosphor to enable free movement of individual phosphor particles thereof;

sieving of said dehydrated reagent resistant phosphor to break up agglomerates resultant from said dehydration;

final baking of said reagent resistant phosphor to remove combustible contaminants therefrom; and final sieving of said baked reagent resistant phosphor to remove agglomerates resultant from said final baking and provide a range of particle sizes suitable for reuse in cathode ray tube screen pattern fabrication.

2. In considering the materials utilized in color cathode ray tube screen fabrication, a method for reclaiming a substantially reagent resistant rare earth cathodoluminescent phosphor from a phosphor salvage mixture including at least one sulfide phosphor, said reagent resistant phosphor being at least one rare earth host compound selected from the group consisting essentially of vanadate containing host compounds of yttrium, gadolinium and lutetium, said host compounds being activated with at least one rare earth element selected from the group consisting essentially of europium and samarium, said method comprising the steps of:

collecting said mixture of said rare earth and sulfide phosphors;

water washing of said mixture of a rare earth and sulfide phosphors to remove water soluble contaminants therefrom;

initial drying of said washed mixture of a rare earth and sulfide phosphors to facilitate free movement of individual phosphor particles;

coarse sieving of said dried mixture of a rare earth and sulfide phosphors through a sieve having openings larger than .044 millimeter to remove large size phosphor particles and contaminants therefrom;

initial baking of said coarse sieved mixture of a rare earth and sulfide phosphors in excess of 400° C. to remove combustible contaminants;

sieving of said baked mixture of a rare earth and sulfide phosphors to break up and remove agglomerates resultant from said baking;

reagent washing said sieved mixture of a rare earth and sulfide phosphors in a dilute acid selected from the group consisting essentially of hydrochloric, sulfuric, and nitric acids at a minimum temperature of 60° C. to decompose said sulfide phosphor into soluble materials to facilitate the removal thereof from the presence of said rare earth phosphor;

rinsing of said reagent resistant rare earth phosphor with water to remove said acid and decomposed sulfide soluble phosphor materials therefrom;

selective chemical washing of said reagent resistant rare earth phosphor in an ammonium hydroxide solution at a temperature not exceeding 100° C. to remove substantially copper contaminants;

rinsing of said reagent resistant rare earth phosphor with water to remove decomposed copper contaminant materials therefrom;

dehydrating said washed reagent resistant rare earth phosphor to enable free movement of individual phosphor particles;

sieving of said dehydrated reagent resistant rare earth phosphor to break up agglomerates resultant from said dehydration;

final baking of said reagent resistant rare earth phosphor in excess of 400° C. but not approaching the decomposition temperature of said rare earth phosphor to remove combustible contaminants therefrom; and final sieving of said baked reagent resistant rare earth phosphor through a sieve having openings of a size not exceeding .044 millimeter to remove agglomerates resultant from said final baking and provide a range of particle sizes suitable for reuse in cathode ray tube screen pattern fabrication.

3. In considering the materials utilized in color cathode ray tube screen fabrication, a method for reclaiming a substantially reagent resistant rare earth cathodoluminescent phosphor from a phosphor salvage mixture including at least one sulfide phosphor, said reagent resistant phosphor having a host crystal selected from the group consisting essentially of yttrium vanadate, gadolinium vanadate, and lutetium vanadate activated by at least one trivalent rare earth element selected from the group consisting essentially of europium and samarium; and said sulfide phosphor being selected from the group consisting essentially of zinc sulfide and zinc-cadmium sulfide, said method comprising the steps of:

collecting said mixture of said rare earth and sulfide phosphors;

water washing of said mixture of a rare earth and sulfide phosphors to remove water soluble contaminants therefrom;

initial drying of said washed mixture of a rare earth and sulfide phosphors within the range of 90° and 200° centigrade to facilitate free movement of individual phosphor particles;

coarse sieving of said dried mixture of a rare earth and sulfide phosphors through a sieve having openings larger than .044 millimeter to remove large size phosphor particles and contaminants therefrom;

initial baking of said coarse sieved mixture of a rare earth and sulfide phosphors in excess of 400° C. to remove combustible contaminants;

sieving of said baked mixture of a rare earth and sulfide phosphors to break up and remove agglomerates resultant from said baking;

reagent washing said sieved mixture of a rare earth and sulfide phosphors in a dilute acid selected from the group consisting essentially of hydrochloric, sulfuric, and nitric acids at a minimum temperature of 60° C. to decompose said sulfide phosphor into soluble materials to facilitate the removal thereof from the presence of said rare earth phosphor;

rinsing of said reagent resistant rare earth phosphor with water to remove said acid and decomposed sulfide soluble phosphor materials therefrom;

selective chemical washing of said reagent resistant rare earth phosphor in an ammonium hydroxide solution at a temperature not exceeding 100° C. to remove substantially copper contaminants;

rinsing of said reagent resistant rare earth phosphor with water to remove decomposed copper contaminant materials therefrom;

dehydrating said washed reagent resistant rare earth phosphor to enable free movement of individual phosphor particles;

sieving of said dehydrated reagent resistant rare earth phosphor to break up agglomerates resultant from said dehydration;

final baking of said reagent resistant rare earth phosphor in excess of 400° C. but not approaching the decomposition temperature of said rare earth phosphor to remove combustible contaminants therefrom; and final sieving of said baked reagent resistant rare earth phosphor through a sieve having openings of a size not exceeding .044 millimeter to remove agglomerates resultant from said final baking and provide a range of particle sizes suitable for reuse in cathode ray tube screen pattern fabrication.

References Cited

UNITED STATES PATENTS 3,348,924 10/1967 Levine et al. -------- 23—312

TOBIAS E. LEVOW, Primary Examiner

R. D. EDMONDS, Assistant Examiner

U.S. Cl. X.R.

23—312; 117—33.5